Nov. 12, 1946.  J. S. ROBBINS  2,411,057
HOSE COUPLING
Filed July 2, 1945
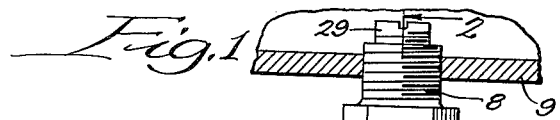
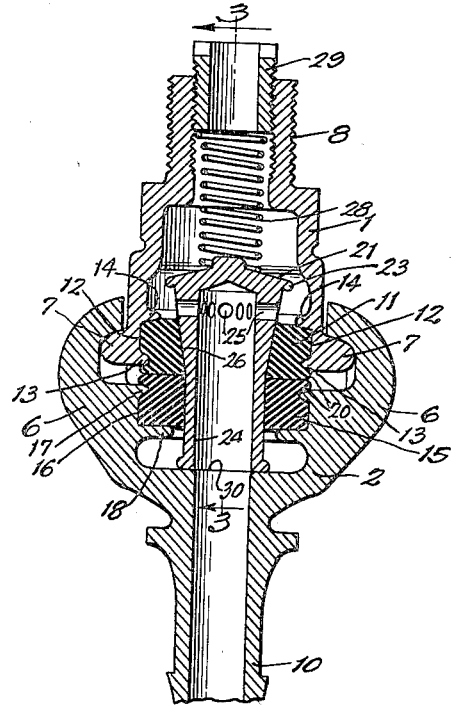
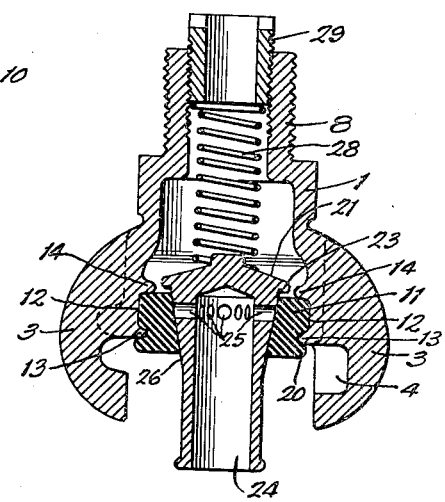
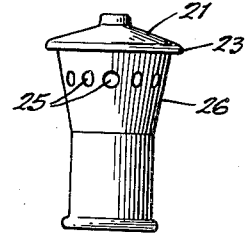
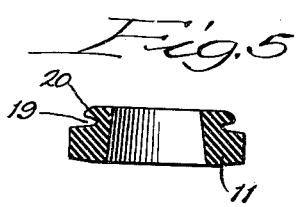
Inventor:
James S. Robbins,
By Rummler Rummler & Davis,
Attorneys.

Patented Nov. 12, 1946

2,411,057

UNITED STATES PATENT OFFICE 2,411,057

HOSE COUPLING

James S. Robbins, Highland Park, Ill.

Application July 2, 1945, Serial No. 602,739

1 Claim. (Cl. 284—19)

This invention relates to hose and pipe couplings, particularly of the type where a branch or continuing line is to be readily connected and disconnected from a conduit under pressure.

The main objects of this invention are to provide a simplified and improved form of automatic valve mechanism that is particularly useful in connection with quick acting hose and pipe coupling devices; to provide an improved form of valve structure for such devices; and to provide an improved arrangement of the valve and packings in such a device so as to effectively seal the coupling against leakage or spurting of liquid to the exterior during the act of making or breaking the connection between the members of the coupling while under pressure.

A specific embodiment of this invention is shown in the accompanying drawing, in which:

Figure 1 is an exterior view of an illustrative specific form of hose coupling to which the present invention is applicable.

Fig. 2 is an axial section taken on the line 2—2 of Fig. 1 with automatic valve and packing arrangements made according to the present invention and showing the relation of the parts when coupled.

Fig. 3 is a section of the same taken on the line 3—3 of Fig. 2 and omitting the lower coupling member to show the normally closed position of the valve.

Fig. 4 is an elevation of the valve removed from the remainder of the structure.

Fig. 5 is a transverse section of one of the packing rings.

In the drawing, the coupling is made up of two body members 1 and 2 formed for quick detachable end-to-end connection with each other. In the form shown the member 1 has a pair of diametrically opposed ears 3 which overlap the head end of the member 2 and are notched at 4 to receive and engage lugs or shoulders 5 in a sort of bayonet-joint engagement for interlocking the members 1 and 2. Similarly, the member 2 has ears 6 which have bayonet-joint interlocking relation to lugs or shoulders 7 on the body member 1, as is illustrated in Figs. 1, 2 and 3.

In the form shown, the member 1 has a threaded nipple 8 which may be screwed into a supply pipe 9 and the member 2 has a shouldered nipple portion 10 of the usual type for endwise insertion into and connection to a flexible hose.

A packing ring 11 is seated at the head end of the member 1 in an annular seat 12 formed by spaced internal annular ribs 13 and 14. A similar packing ring 15 is mounted in the member 2 in a seat 16 between inwardly projecting spaced annular ribs 17 and 18. The packing rings 11 and 15 have peripheral grooves 19 to receive the ribs 13 and 17 respectively, thus providing a flange 20 on the packing whereby it may be gripped by a suitable tool and removed from its seat.

The member 1 has mounted therein a valve 21 of thimble form which is closed at the top and has a tubular stem that normally extends through the packing rings 11 and 15. The head of the valve 21 has an overhanging marginal flange 23 positioned to engage the top of the packing ring 11 when the valve is closed. The stem of the valve which extends axially through the rings 11 and 15 has a fluid passage 24 extending upwardly from its lower end to a point near the head end of the valve where it branches laterally in the form of a plurality of radially arranged ports 25 of size and number suited to a chosen rate of flow of fluid through the fitting.

The outer surface of the stem has a conical surface 26 converging downwardly from the flange 23 for some distance and is then of cylindrical form at its lower portion. A helical spring 28 bears on the head of the valve 21 and normally urges the valve to its closed position. The tension of the spring 28 is adjusted by means of a sleeve nut 29 which is threaded into the nipple 8.

The packing 11 in the coupling member 1 has a conical bore conforming to the tapered outer wall 26 of the valve stem and is of such dimensions that the packing 11 will close the radial ports 25 against any leakage when the valve is in its closed position, as shown in Fig. 3; but the flange 23 on the valve head will always assure a sealing closure for the valve even when the packing has become considerably worn, although when the packing is new its dimensions may be such that the valve will close tightly before the flange has become seated thereon, as is illustrated in Fig. 3.

Abutment means shown in the form of an annular shoulder 30 in the interior of the member 2 is positioned to engage the lower end of the valve stem to force the valve upwardly to its open position as illustrated in Fig. 2 when the members 1 and 2 are interlocked in coupled relation. The packing rings 11 and 15 should be of such thickness that considerable pressure has to be exerted in an axial direction in order to bring the parts into their interlocked relation. This all contributes toward the security of the fastening of the parts together and also assures that the resilient packing rings will at all times tend to expand and fit snugly against the outer walls of the valve stem and prevent any leakage to the exterior while the coupling members are being connected or disconnected.

The operation of the movable parts of the structure shown is fully shown in the drawing and will be understood without further description.

Although but one specific embodiment of this invention is herein shown and described, it is understood that details of the construction shown may be altered or omitted without departing from the spirit of this invention as defined by the following claim.

I claim:

A hose coupling, comprising a pair of tubular members having detachably interlocking end to end engagement with each other, a pair of coacting packing rings respectively mounted at the abutting ends of said members, each of said rings having an annular peripheral groove intermediate its ends, each of said members having an annular shoulder abutting the inner end of its respective said packing ring and having an annular rib for engaging the peripheral groove of the packing ring, a valve in one of said members comprising a tubular stem adapted to extend through said packing rings, an enlarged closed head at the inner end of said stem, an externally tapered shank adjacent said head and converging away from said head, radial ports in said shank adjacent said head, the other said member having means for engaging the adjacent end of said stem to shift said valve and cause said ports to move inward clear of the packing ring of said one member, said one member being formed to provide a fluid passage around said valve head, means normally urging said valve to a closed position, said tapered shank being adapted in such closed position of the valve to wedgingly engage the adjacent packing ring to close said ports and simultaneously compress the ring radially against the adjacent wall of said one member when said members are separated to release said valve.

JAMES S. ROBBINS.